United States Patent
Chiba

(10) Patent No.: US 10,202,017 B2
(45) Date of Patent: Feb. 12, 2019

(54) VEHICULAR AIR-CONDITIONING DEVICE

(71) Applicant: KEIHIN CORPORATION, Tokyo (JP)

(72) Inventor: Shinya Chiba, Sakura (JP)

(73) Assignee: KEIHIN CORPORATION, Tokyo (JP)

( * ) Notice: Subject to any disclaimer, the term of this patent is extended or adjusted under 35 U.S.C. 154(b) by 144 days.

(21) Appl. No.: 15/038,865

(22) PCT Filed: Nov. 18, 2014

(86) PCT No.: PCT/JP2014/080412
§ 371 (c)(1),
(2) Date: May 24, 2016

(87) PCT Pub. No.: WO2015/079958
PCT Pub. Date: Jun. 4, 2015

(65) Prior Publication Data
US 2016/0375742 A1     Dec. 29, 2016

(30) Foreign Application Priority Data
Nov. 26, 2013   (JP) ................................ 2013-243852

(51) Int. Cl.
*B60H 1/00* (2006.01)
*B60H 1/32* (2006.01)
(Continued)

(52) U.S. Cl.
CPC ....... *B60H 1/00521* (2013.01); *B60H 1/3227* (2013.01); *F28D 1/05375* (2013.01);
(Continued)

(58) Field of Classification Search
CPC ............ B60H 1/00521; B60H 1/00514; B60H 1/00528; B60H 2001/00635; F28F 9/0132;
(Continued)

(56) References Cited

U.S. PATENT DOCUMENTS 3,123,170 A * 3/1964 Bryant ................. B60K 11/04
165/69
4,914,929 A * 4/1990 Shimazaki ......... B60H 1/00521
165/69
(Continued)

FOREIGN PATENT DOCUMENTS

GB   2532768 A  *  6/2016  ......... B60H 1/00521
JP   07-052637     2/1995
(Continued)

OTHER PUBLICATIONS

International Search Report, dated Feb. 24, 2015 (dated Feb. 24, 2015).

*Primary Examiner* — Jon T. Schermerhorn, Jr.
(74) *Attorney, Agent, or Firm* — Rankin, Hill & Clark LLP

(57) ABSTRACT

In this vehicular air-conditioning device, an inner wall surface along a width direction of an air-conditioning casing is provided with guide portions each extending in a vertical direction. The guide portions are recessed on the outside in the width direction, forming recesses with respect to the inner wall surface. When an evaporator is inserted from above the air-conditioning casing and assembled inside, second seal portions of side plates disposed on side surfaces of the evaporator are respectively inserted into the guide portions, whereby the evaporator is guided along the vertical direction. The guide portions further include an entry portion disposed at an upper end portion of a first guide wall and expanding in a direction away from a second guide wall. Thus, the evaporator can be inserted into the air-conditioning casing from above in a preferable manner.

9 Claims, 4 Drawing Sheets

(51) Int. Cl.
  *F28D 1/053* (2006.01)
  *F28F 9/013* (2006.01)
  *F28D 21/00* (2006.01)

(52) U.S. Cl.
  CPC .. *F28F 9/0132* (2013.01); *B60H 2001/00635* (2013.01); *F28D 2021/0085* (2013.01)

(58) Field of Classification Search
  CPC ............. F28F 2280/00; F28F 2280/04; F28D 2021/0085
  See application file for complete search history.

(56) References Cited

U.S. PATENT DOCUMENTS

| | | | | |
|---|---|---|---|---|
| 5,853,323 | A * | 12/1998 | Beck | B60H 1/00521 137/454.2 |
| 6,129,140 | A * | 10/2000 | Kawahara | B60H 1/00521 165/42 |
| 6,308,770 | B1 * | 10/2001 | Shikata | B60H 1/00064 165/126 |
| 9,267,738 | B2 * | 2/2016 | Komatsubara | B60H 1/00521 |
| 9,316,281 | B2 * | 4/2016 | Koefele | F16F 7/00 |
| 9,671,168 | B2 * | 6/2017 | Gluck | F28D 1/0358 |
| 9,975,396 | B2 * | 5/2018 | Fieger | B60H 1/00585 |
| 2003/0051497 | A1 * | 3/2003 | Nomura | B60H 1/00521 62/239 |
| 2007/0062208 | A1 * | 3/2007 | Toba | B60H 1/00521 62/239 |
| 2015/0159961 | A1 * | 6/2015 | Berndt | B60H 1/00521 165/173 |

FOREIGN PATENT DOCUMENTS

| | | |
|---|---|---|
| JP | 2005-014706 | 1/2005 |
| JP | 2010-083391 | 4/2010 |
| JP | 2012-144081 | 8/2012 |

\* cited by examiner

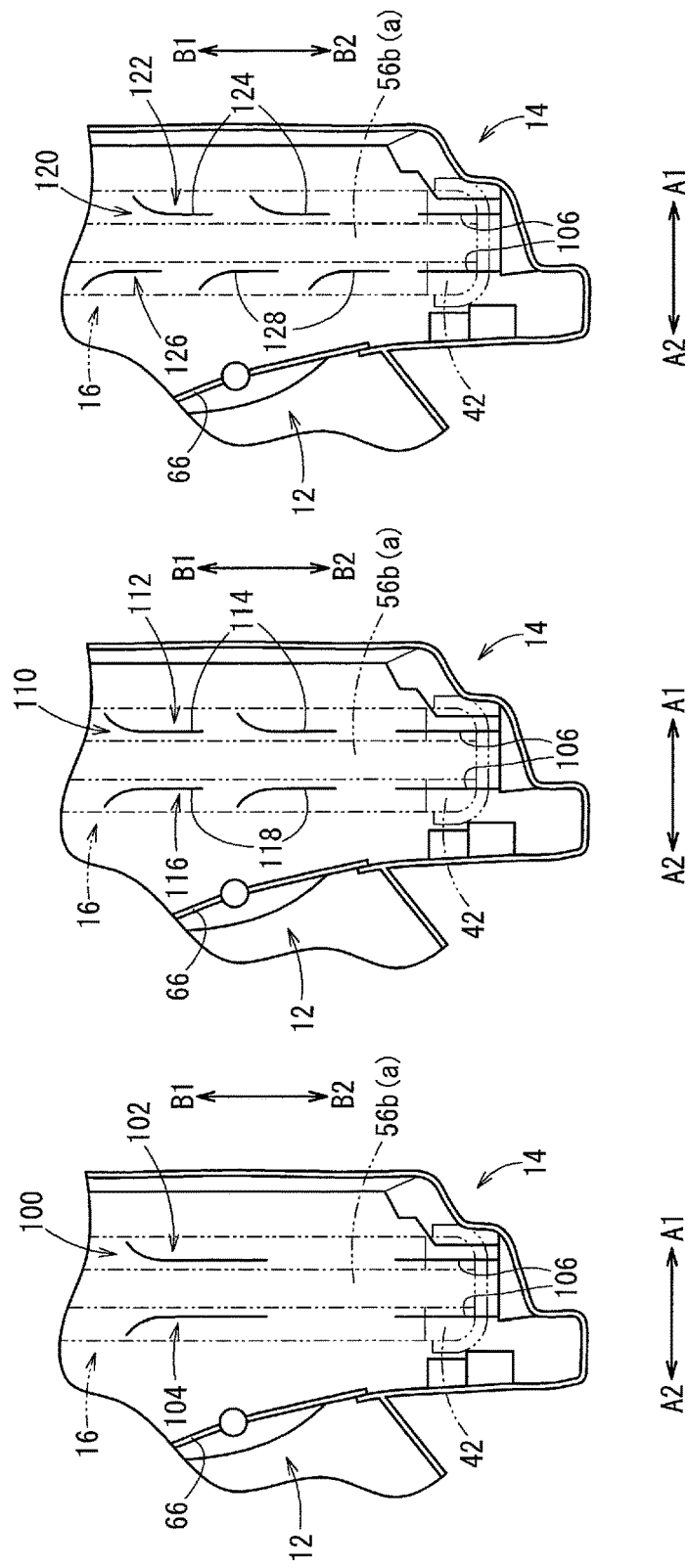

VEHICULAR AIR-CONDITIONING DEVICE

TECHNICAL FIELD

The present invention relates to a vehicular air conditioner (vehicular air-conditioning device) that is mounted in a vehicle for adjusting the temperature in the interior of a vehicle cabin by blowing air into the vehicle cabin, the temperature of the air being adjusted by a heat exchanger.

BACKGROUND ART

Heretofore, a vehicular air conditioner, which is mounted in a vehicle, takes in interior and exterior air by a fan into an air conditioner casing having an airflow passage in the interior thereof, and after mixing chilled air, which is cooled by an evaporator type of cooling means, and heated air, which is heated by a heater core type of heating means, by operation of a damper inside the air conditioner casing at a desired mixing ratio, the mixed air is made to pass from a plurality of openings disposed in the casing and through an outlet port, and is blown out into the vehicle cabin interior, whereby adjustment of temperature and humidity is carried out in the interior of the vehicle cabin.

With such a vehicular air conditioner, as disclosed in Japanese Laid-Open Patent Publication No. 2010-083391, when the evaporator is assembled with respect to the air conditioner casing, the evaporator is inserted into the interior of the air conditioner casing first from a tank that is disposed on one end thereof, and the evaporator is assembled at a predetermined position by insertion of the tank along a guide that is formed in the air conditioner casing.

SUMMARY OF INVENTION

However, in the above-described vehicular air conditioner, when the tank of the evaporator is inserted while in contact with the guide, generally speaking, since the side surface of the tank is formed with a curved shape in cross section, the side surface makes line contact with respect to the guide, and thus it is likely for the evaporator to become inclined about the tank in the forward/rearward direction of the vehicle. As a result, it is essential for assembly to be performed while an operator corrects the inclination of the evaporator toward the predetermined direction of insertion, and ease of assembly is adversely affected. Further, by subjecting the evaporator to inclination, fins and tubes thereof, which are exposed to the exterior, tend to come into contact with the air conditioner casing and other members, leading to a concern that damage to the fins and tubes may occur.

A general object of the present invention is to provide a vehicular air conditioner, which enables a heat exchanger to be assembled easily and reliably with respect to an air conditioner casing.

A vehicular air conditioner according to the present invention includes an air conditioner casing in which a passage configured to flow air is included in interior thereof, and a heat exchanger disposed in facing relation to the passage in the interior of the air conditioner casing, wherein:

the heat exchanger includes a pair of tanks disposed with an interval provided mutually therebetween, plural tubes disposed between the tanks and opposite ends of which are connected respectively to the tanks, and side plates provided on both ends in a longitudinal direction of the tanks and which are disposed substantially in parallel with the tubes;

on the side plates, there are provided rail members extending in a longitudinal direction of the side plates, and projecting in directions away from the tubes with respect to the side plates; and in the air conditioner casing, there are provided an insertion opening through which the heat exchanger is inserted, and a pair of guides extending toward an inner side in an insertion direction from the insertion opening, and being configured to guide the heat exchanger by abutment against side surfaces of the rail members.

According to the present invention, in the heat exchanger that is used in the vehicular air conditioner, the side plates that are disposed on both ends of the pair of tanks are provided, and the rails extending along the longitudinal direction of the side plates are disposed to project out in directions away from the tubes. In addition, the rails are guided by the side surfaces of the rails abutting against the pair of guides, which extend toward the inner side in the insertion direction from the insertion opening in the air conditioner casing into which the heat exchanger is inserted.

Consequently, when the heat exchanger is assembled in the interior of the air conditioner casing, by carrying out assembly thereof while the side surfaces of the rails of the heat exchanger are made to abut against the guides formed in the air conditioner casing, since the heat exchanger can be guided along the guides while in surface contact toward the inner side in the insertion direction from the insertion opening, inclination of the heat exchanger with respect to the insertion direction can be prevented, and the heat exchanger can easily and reliably be assembled at a predetermined position in the interior of the air conditioner casing. Further, since inclination of the heat exchanger upon assembly thereof can be avoided, the tubes, etc., that constitute the heat exchanger are prevented from becoming damaged by coming into contact with the air conditioner casing.

BRIEF DESCRIPTION OF DRAWINGS

FIG. 4A is an enlarged cross sectional view of an air conditioner casing showing a guide according to a first modification;

FIG. 4B is an enlarged cross sectional view of an air conditioner casing showing a guide according to a second modification; and FIG. 4C is an enlarged cross sectional view of an air conditioner casing showing a guide according to a third modification.

DESCRIPTION OF EMBODIMENTS

Figure 1:
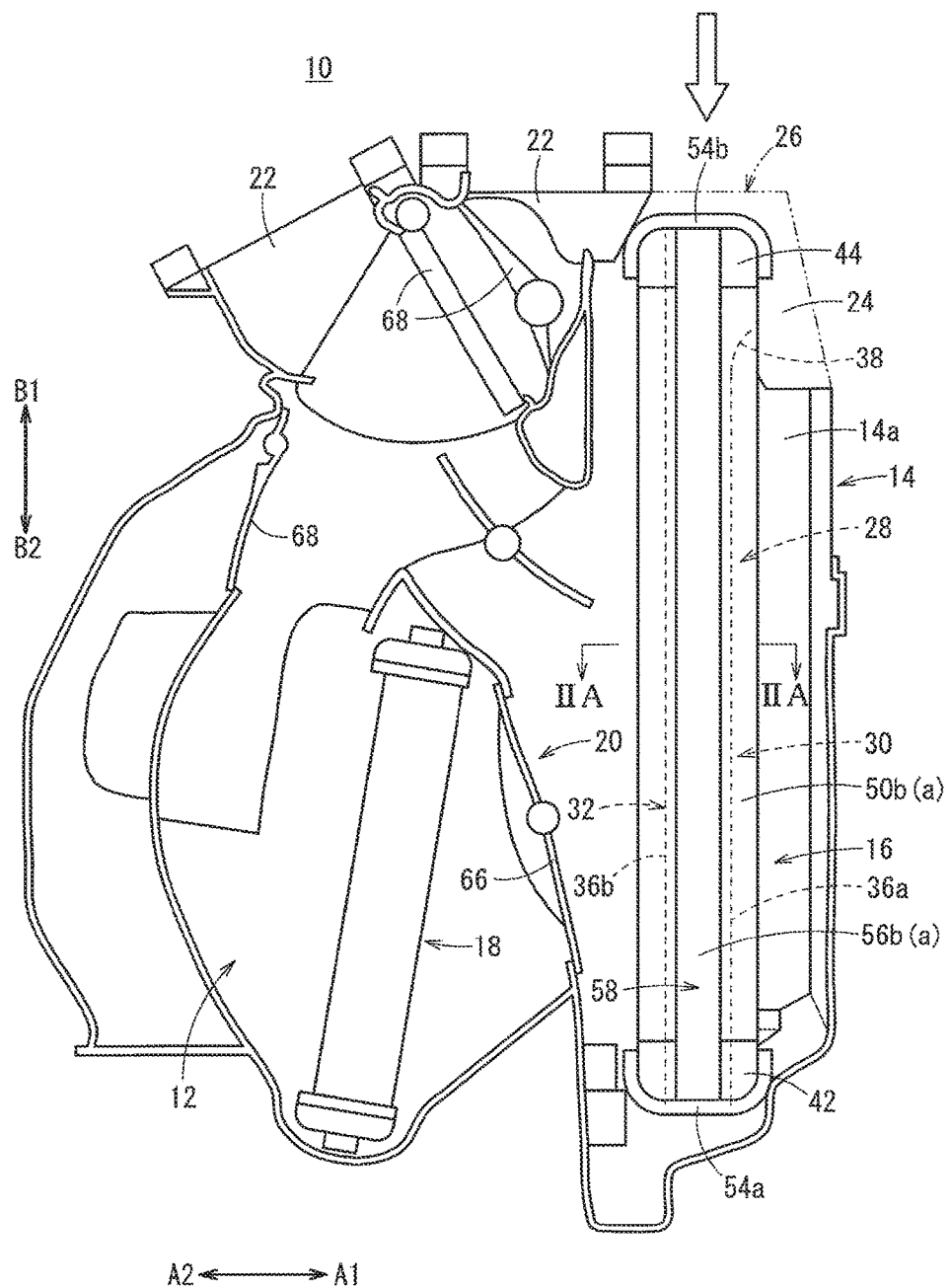
FIG. 1 is an overall cross-sectional view of a vehicular air conditioner according to an embodiment of the present invention.

As shown in FIG. 1, a vehicular air conditioner 10 includes an air conditioner casing 14 constituted by respective airflow passages 12, an evaporator (heat exchanger) 16 arranged in the interior of the air conditioner casing 14 for cooling the air, a heater core 18 for heating the air, and a damper mechanism 20, which operates to switch the flow of air that flows through the respective passages 12.

The air conditioner casing 14 is formed in a box shape from a resin material, and plural blower openings 22, which communicate with the respective passages 12 and blow air toward the front window or in the vicinity of the face of a vehicle occupant, are formed in an upper portion of the air conditioner casing 14. The right side (in the direction of the arrow A1) of the vehicular air conditioner 10 shown in FIG. 1 will be referred to as a front side of the vehicle, and the left side (in the direction of the arrow A2) will be referred to as a rear side of the vehicle.

Further, on an upper portion of the air conditioner casing 14, an insertion opening 24 opens at a position on the front side of the vehicle (in the direction of the arrow A1) adjacent to the blower openings 22. The evaporator 16 is inserted through the insertion opening 24 into the interior of the air conditioner casing 14. After the evaporator 16 has been inserted therein, the insertion opening 24 is covered by a cover member 26 (refer to the two-dot-dashed line in. FIG. 1).

Figure 2A:
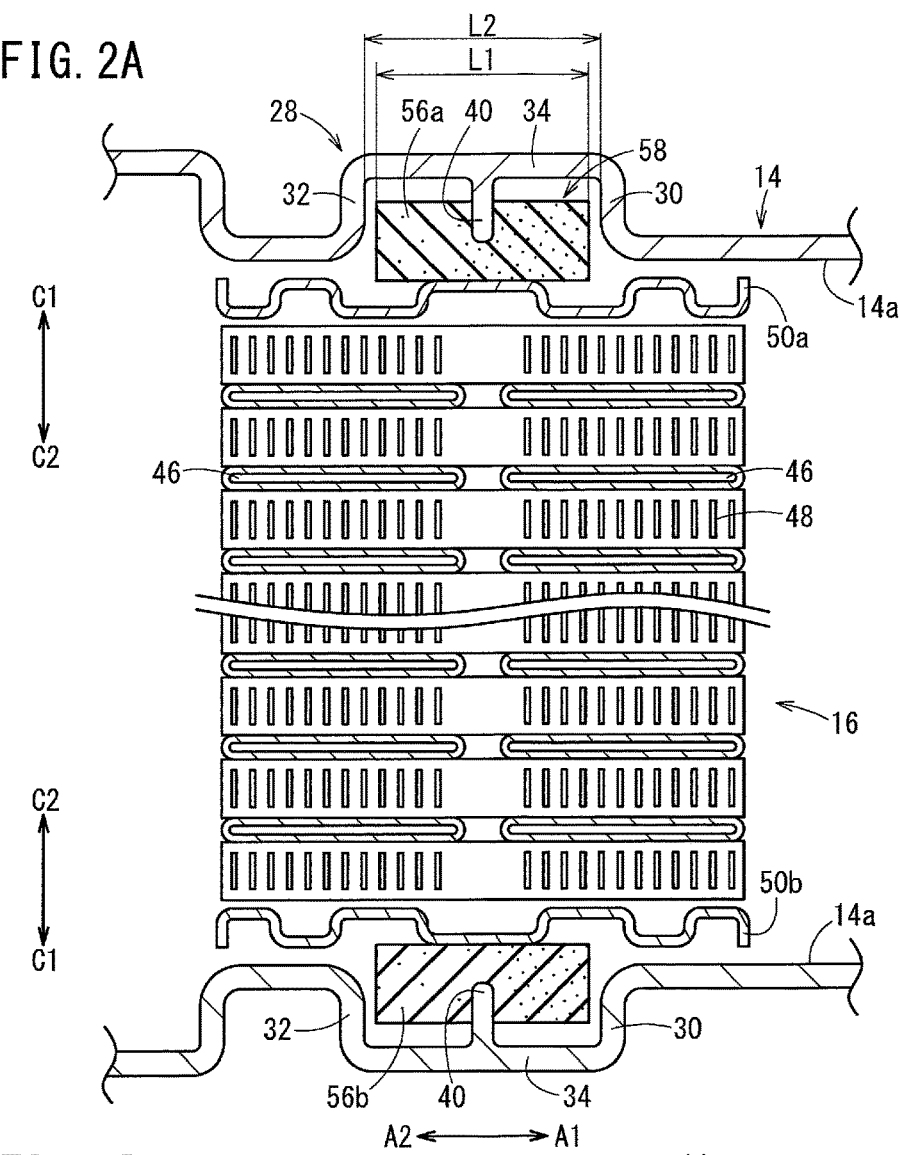
FIG. 2A is a cross-sectional view taken along line IIA-IIA of FIG. 1.

On the other hand, as shown in FIGS. 1 and 2A, in the interior of the air conditioner casing 14, a pair of guide members (guides) 28 are provided, which guide the evaporator 16 along inner wall surfaces 14a on both sides in the widthwise direction of the air conditioner casing 14 to a predetermined position. The guide members 28 are disposed to face toward the insertion opening 24 of the air conditioner casing 14, are formed respectively in recessed shapes, which are recessed outwardly (in the directions of the arrows C1 in FIG. 2A) at a predetermined depth in the widthwise direction with respect to the inner wall surfaces 14a of the air conditioner casing 14, and extend along the vertical direction (the directions of arrows B1, B2 in FIG. 1).

The guide members 28 are U-shaped in cross section, and include first guide walls 30, which are formed on the front side of the vehicle (in the direction of the arrow A1), second guide walls 32, which are formed on the rear side of the vehicle (in the direction of the arrow A2) and are separated by a predetermined distance with respect to the first guide walls 30, and connecting walls 34 that interconnect the first guide walls 30 and the second guide walls 32. Additionally, as shown in FIG. 2A, the first and second guide walls 30, 32 are arranged substantially perpendicularly with respect to the inner wall surfaces 14a of the air conditioner casing 14, and the connecting walls 34 are formed substantially in parallel with the inner wall surfaces 14a.

The first and second guide walls 30, 32 include, respectively, straight line sections 36a, 36b that are formed in straight line shapes along the vertical direction (the directions of arrows B1, B2). In addition, on upper end parts of the straight line sections 36a on the first guide walls 30, inlet portions 38 are formed, which are formed so as to expand in an upward direction (the direction of the arrow B1) gradually toward the front end side of the vehicle (in the direction of the arrow A1).

The inlet portions 38 are formed with arcuate shapes in cross section, which are convexly shaped upwardly (in the direction of the arrow B1), for example, such that the intervals formed by the inlet portions 38 between the first guide walls 30 and the second guide walls 32 are formed so as to expand gradually in the vicinity of the upper ends thereof.

Additionally, as shown in FIG. 1, the first and second guide walls 30, 32 are formed such that the upper ends of the first guide walls 30 are arranged lower (in the direction of the arrow B2) by a predetermined height than the upper ends of the second guide walls 32. More specifically, concerning the first guide walls 30 and the second guide walls 32, the upper ends thereof are formed to be offset by a predetermined height in the heightwise direction (the directions of arrows B1, B2) of the air conditioner casing 14.

On the other hand, as shown in FIG. 2A, on the connecting walls 34, projections (sealing parts) 40 are formed that project out toward the side of the evaporator 16 (in the direction of the arrow C2) substantially in the center in the widthwise direction thereof. The projections 40 are formed substantially in parallel with the first and second guide walls 30, 32, and extend in straight lines along the vertical direction (the directions of arrows B1, B2).

In the interior of the air conditioner casing 14, as shown in FIG. 1, the evaporator 16 is disposed through the guide members 28 at a position on an upstream side (in the direction of the arrow A1) in the direction through which the air flows, whereas the heater core 18 is disposed at a position separated by a predetermined distance on a downstream side (in the direction of the arrow A2) with respect to the evaporator 16.

Figure 3:
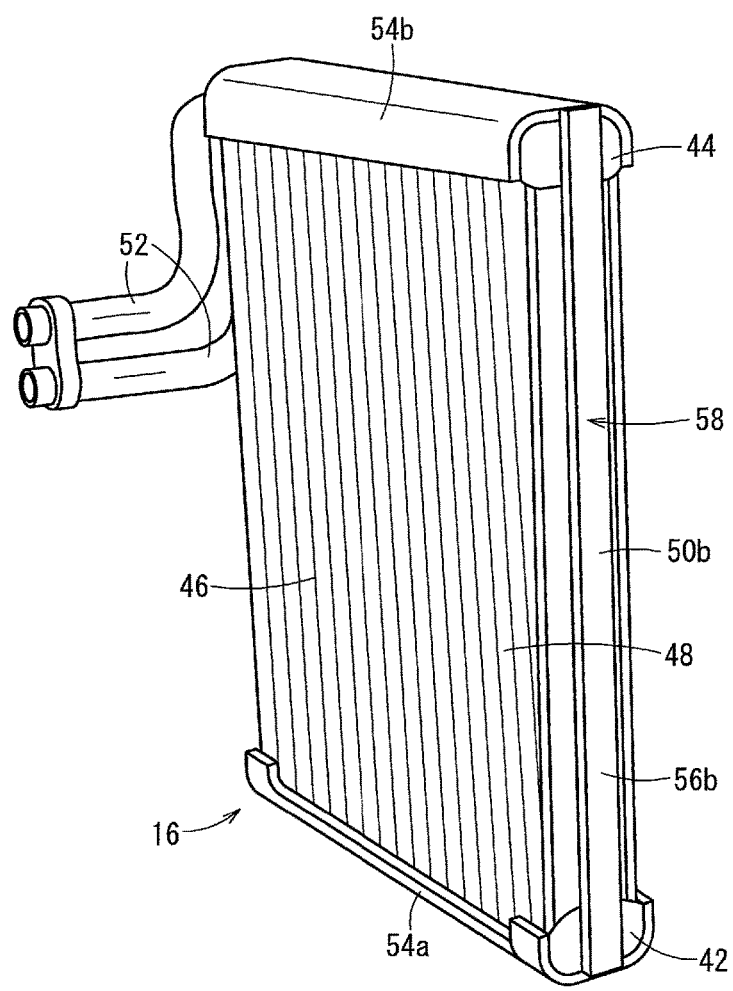
FIG. 3 is an exterior perspective view of an evaporator that makes up the vehicular air conditioner of FIG. 1.

For example, as shown in FIGS. 1 and 3, the evaporator 16 includes a pair of first and second tanks (tanks) 42, 44, which are separated by a predetermined distance and disposed substantially in parallel, multiple tubes 46 that are connected mutually to the first tank 42 and the second tank 44, fins 48 provided between the tubes 46, and a pair of side plates 50a, 50b, which are connected to both ends along the longitudinal direction of the first and second tanks 42, 44. In addition, the evaporator 16 is accommodated in the air conditioner casing 14 such that the first tank 42 is located at a lower position, and the second tank 44 is located at an upper position, and a pair of pipes 52 through which a refrigerant is supplied and discharged are connected to the second tank 44.

Moreover, after the refrigerant, which is supplied through the pipes 52 to the second tank 44, has flowed through the plural tubes 46 and into the first tank 42, the refrigerant is recirculated to the second tank 44, whereby heat exchange is carried out between the refrigerant and the air that passes between the tubes 46 and the fins 48.

Further, a seal member 58, which is formed from a resilient material such as rubber, urethane, or the like, for example, is included on the evaporator 16. The seal member 58 is constituted from a pair of first seal members 54a, 54b, which are mounted on the first and second tanks 42, 44, and a pair of second seal members (rail members) 56a, 56b, which are mounted on the side plates 50a, 50b.

The seal member 58 is formed integrally in a substantially rectangular shape, in which ends of the first seal members 54a, 54b and ends of the second seal members 56a, 56b are connected, each of which are bonded, respectively, to the first and second tanks 42, 44 and to the side plates 50a, 50b on the evaporator 16.

The first seal members 54a, 54b are formed respectively with curved shapes in cross section in covering relation to the first and second tanks 42, 44, whereas as shown in FIGS. 2A and 3, for example, the second seal members 56a, 56b have a predetermined thickness with rectangular shapes in cross section, are mounted centrally in the widthwise direction of the side plates 50a, 50b, and are formed in straight line shapes along the height direction (the directions of arrows B1, B2) thereof.

In addition, the first tank 42 side of the evaporator 16 is inserted from above into the interior of the air conditioner casing 14 through the insertion opening 24, and the pair of second seal members 56a, 56b, which are mounted on both side surfaces thereof, are guided along the vertically downward direction (in the direction of the arrow B2) by being inserted between the first guide walls 30 and the second guide walls 32 in the guide members 28, together with the second seal members 56a, 56b abutting against (contacting) the projections 40. As shown in FIG. 2A, the width dimension L1 of the second seal members 56a, 56b in the forward/rearward direction (the directions of arrows A1, A2) of the vehicle is formed to be substantially the same or slightly smaller than the distance (guide width) L2 between the first guide walls 30 and the second guide walls 32 in the guide members 28 (L1≅L2, L1<L2).

Figure 2B:
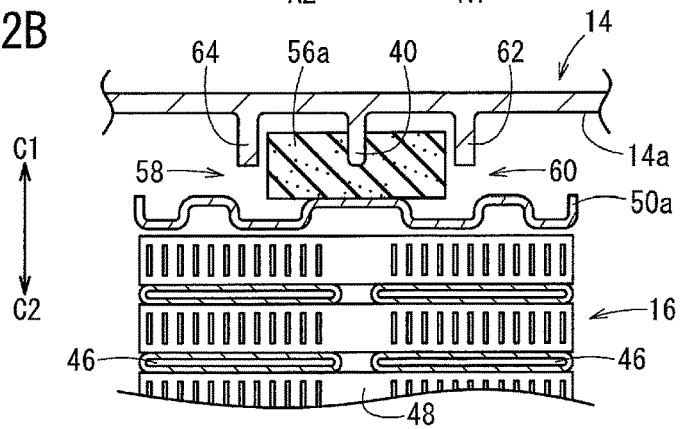
FIG. 2B is a cross-sectional view showing a guide according to a modification.

Moreover, the guide members 28 are not limited to the case of being formed in recessed shapes that are recessed outwardly in the widthwise direction (the directions of arrows C1) with respect to the inner wall surfaces 14a of the air conditioner casing 14. For example, as with guide members 60 shown in FIG. 2B, they may be formed by a pair of rib-shaped first and second guide walls 62, 64, which project at a predetermined height inwardly in the widthwise direction (the directions of arrows C2) with respect to the inner wall surfaces 14a.

As shown in FIG. 1, the damper mechanism 20 is constituted from an air mixing damper 66 that is disposed between the evaporator 16 and the heater core 18, and plural switching dampers 68 that switch between air blowing states of the respective blower openings 22. The air mixing damper 66 is formed in the shape of a curved plate, for example, is disposed along the widthwise direction of the air conditioner casing 14, and is supported for rotation by insertion of a substantially centrally disposed shaft member respectively through the side walls of the air conditioner casing 14.

In addition, by application of a rotational force with respect to the shaft member under a driving action of a non-illustrated actuator, the air mixing damper 66 is rotated through a predetermined angle, accompanied by the air (chilled air) that is cooled by the evaporator 16, and the air (heated air) that is heated by the heater core 18 being mixed together, adjusted to a given mixing ratio, and blown out toward the downstream side. Further, by selectively rotating the plural switching dampers 68 under the driving action of a non-illustrated actuator, states of communication between the blower openings 22 and the passages 12 of the air conditioner casing 14 are switched, whereby the state at which air is blown through the blower openings 22 into the interior of the vehicle compartment is switched.

The vehicular air conditioner 10 according to the present embodiment is constructed basically as described above. Next, a case will be described in which the evaporator 16 is assembled with respect to the air conditioner casing 14.

At first, in a state in which the insertion opening 24 is opened without the cover member 26 being mounted on the upper portion of the air conditioner casing 14 in FIG. 1, an operator (not shown) grips the evaporator 16 so that the first tank 42 thereof is oriented downwardly (in the direction of the arrow B2), and inserts the first tank 42 through the insertion opening 24 into the interior of the air conditioner casing 14.

In addition, by the pair of second seal members 56a, 56b on the seal member 58 of the evaporator 16 being inserted respectively between the first guide walls 30 and the second guide walls 32 of the guide members 28, which are disposed in facing relation to the insertion opening 24, the evaporator 16 including the second seal members 56a, 56b is guided along the vertically downward direction (in the direction of the arrow B2), and is directed to a predetermined position in the interior of the air conditioner casing 14.

More specifically, the vertically downward direction (the direction of the arrow B2 in FIG. 1) is an inner side in the direction of insertion when the evaporator 16 is inserted into the air conditioner casing 14.

At this time, since the evaporator 16 is prevented from becoming inclined as a result of being guided along the guide members 28, the evaporator 16 can easily and reliably be assembled with respect to the air conditioner casing 14, while in addition, the tubes 46 and the fins 48 of the evaporator 16 are prevented from coming into contact with the air conditioner casing 14 or the damper mechanism 20.

More specifically, since the second seal members 56a, 56b are inserted while being placed in surface contact with respect to at least one of the first and second guide walls 30, 32, the assembly operation can be performed in a stable manner without the occurrence of inclination.

Further, when the evaporator 16 begins to be inserted from the insertion opening 24, even in the case that the evaporator 16 undergoes a slight amount of inclination, for example, the lower ends of the second seal members 56a, 56b contact the inlet portions 38 of the first guide walls 30, and upon being inserted further, are guided gradually from the inlet portions 38 into the straight line sections 36a, accompanied by the inclined state of the evaporator 16 being inserted and gradually corrected, as a result of being guided between the first guide walls 30 and the second guide walls 32.

Lastly, after the first tank 42 of the evaporator 16 has been inserted up to the bottom portion in the air conditioner casing 14 and held in a predetermined position, the insertion opening 24 is closed by the cover member 26, whereupon the assembly of the evaporator 16 with respect to the air conditioner casing 14 is completed.

In the foregoing manner, with the above-described embodiment, on the inner wall surfaces 14a of the air conditioner casing 14 that makes up the vehicular air conditioner 10, the guide members 28 are provided for guiding the second seal members 56a, 56b that are mounted on both side surfaces of the evaporator 16, and the guide members 28 are formed so as to extend along the vertical direction (the directions of arrows B1, B2) of the air conditioner casing 14. Consequently, when the evaporator 16 is inserted from above the air conditioner casing 14, the second seal members 56a, 56b, which are mounted on the side plates 50a, 50b, are inserted between the first guide walls 30 and the second guide walls 32 that make up the guide members 28, and by insertion of the side surfaces thereof while in surface contact with at least one of the first and second guide walls 30, 32, the evaporator 16 is capable of being assembled easily and reliably at a predetermined position in the air conditioner casing 14, without the evaporator 16 becoming inclined with respect to the predetermined insertion direction.

Further, on upper ends of the first guide walls 30, the inlet portions 38 into which the evaporator 16 is inserted are provided, which expand upwardly (in the direction of the arrow B1) gradually in directions away from the second guide walls 32. Consequently, when the second seal members 56a, 56b are inserted with respect to the guide members 28, since the vicinity of the insertion opening 24 on the guide members 28 opens widely, it is easy for the second seal members 56a, 56b to be inserted at the time that they begin to be inserted into the guide members 28, and catching of the second seal members 56a, 56b on the upper ends of the guide members 28 is avoided. As a result, the second seal members 56a, 56b of the evaporator 16 can be inserted more easily and smoothly with respect to the guide members 28.

Furthermore, in the evaporator 16, the second seal members 56*a*, 56*b* of the seal member 58 are used as rail members, which prevent leakage of air through gaps by abutting against the air conditioner casing 14 when the evaporator 16 is assembled into the air conditioner casing 14. Compared to the case of providing such rail members separately from the second seal members 56*a*, 56*b*, the number of parts and manufacturing costs can be reduced.

Further still, when the air conditioner casing 14 is molded, the guide members 28 are capable of easily being formed therein so as to project outwardly in the widthwise direction of the air conditioner casing 14. Therefore, it is possible for the manufacturing process to be shortened without requiring the guide members 28 to be formed by a separate process, while additionally, the rigidity of the air conditioner casing 14 can be increased, and the interior space thereof can be utilized effectively.

Still further, the inlet portions 38 of the first guide walls 30 and the upper ends of the second guide walls 32 are offset from one another in the height direction (the directions of arrows B1, B2). Therefore, when the second seal members 56*a*, 56*b* are inserted into the guide members 28, catching or snagging thereof is avoided, and by facilitating the insertion between the first guide walls 30 and the second guide walls 32, ease of assembly can be enhanced.

The inlet portions 38 are not limited to the case of being disposed on upper ends of the first guide walls 30. For example, instead of the first guide walls 30, the inlet portions 38 may be disposed on upper ends of the second guide walls 32, or may be disposed respectively on both of the first and second guide walls 30, 32.

Further, by forming the second seal members 56*a*, 56*b*, which are mounted on the side plates 50*a*, 50*b*, and the first seal members 54*a*, 54*b*, which are mounted on the first and second tanks 42, 44, in an integral manner to thereby make up the single seal member 58, compared to the case of installing the first seal members 54*a*, 54*b* and the second seal members 56*a*, 56*b* as separate structures, respectively, when adhered to the evaporator 16, ease of assembly can be enhanced in the form of an integral shape. In addition, it is possible to improve sealing performance by not providing any joints or seams between the first seal members 54*a*, 54*b* and the second seal members 56*a*, 56*b*. Furthermore, the manufacturing cost required for the seal member 58 can be reduced.

Next, operations of the vehicular air conditioner 10, in which the evaporator 16 is assembled into the air conditioner casing 14 as described above, will briefly be explained.

First, by a vehicle occupant (not shown) operating a lever positioned inside the vehicle cabin in which the vehicular air conditioner 10 is installed, a non-illustrated actuator is driven responsive to the operation of the operating lever, and the air mixing damper 66, to which the driving force is transmitted, is rotated, together with air being delivered into the interior of the air conditioner casing 14 under a driving action of a non-illustrated blower fan.

In addition, after the air has been cooled by flowing through the passages 12 and past the evaporator 16, the cooled air is mixed with air that has flowed through the heater core 18 corresponding to the opening/closing angle of the air mixing damper 66, whereby the air is adjusted to a predetermined temperature, and by a switching operation of the switching dampers 68, is blown out into the interior of the vehicle compartment from the open blower openings 22.

Further, the guide members 28, which are formed in the air conditioner casing 14 in the vehicular air conditioner 10, are not limited to being constituted from the pair of first and second guide walls 30, 32 that extend along the vertical direction (the directions of arrows B1, B2) as described above. For example, as with guide members 100 shown in FIG. 4A, first and second guide walls 102, 104 thereof may be disposed partially, only in the vicinity of an upper portion in the air conditioner casing 14.

In this case, in the vicinity of a bottom portion of the air conditioner casing 14, a pair of retaining walls 106 are provided, which are arranged in a straight line shape at a distance from the first and second guide walls 102, 104, such that when the first tank 42 of the evaporator 16 is inserted up to the vicinity of the bottom portion, the second seal members 56*a*, 56*b* are inserted between the retaining walls 106 and retained thereby.

By configuring the guide members 100 in this manner, compared to the guide members 28, which are formed by the first and second guide walls 30, 32 continuously along the vertical direction (the directions of arrows B1, B2), since the contact area (range) is made smaller when the second seal members 56*a*, 56*b* of the evaporator 16 are inserted and guided, sliding resistance at the time of insertion can be reduced. As a result, it is possible for the evaporator 16 to be assembled more easily and smoothly with respect to the air conditioner casing 14.

Further, as with guide members 110 shown in FIG. 4B, first guide walls 112 may be constituted from a plurality (for example, two) first divided walls 114, which are separated by a predetermined distance along the vertical direction (the directions of arrows B1, B2), and second guide walls 116 may be constituted by a plurality (for example, two) second divided walls 118, which are separated by a predetermined distance along the vertical direction, wherein the first divided walls 114 and the second divided walls 118 are provided in a pair, and are arranged mutually in facing relation to each other. Further, the first and second guide walls 112, 116 are formed with respective lengths that are shorter along the vertical direction (the directions of arrows B1, B2) than the lengths of the first and second guide walls 102, 104 of the guide members 100 shown in FIG. 4A, as mentioned above.

By configuring the guide members 110 in this manner, as a result of the second seal members 56*a*, 56*b* of the evaporator 16 being guided by the first and second guide walls 112, 116, the length dimensions of which are shorter, sliding resistance when the second seal members 56*a*, 56*b* are inserted therein can be reduced, and the assembly operation of the evaporator 16 can be carried out more easily and smoothly.

Further still, as with guide members 120 shown in FIG. 4C, compared to the guide members 110 shown in FIG. 4B, first divided walls 124 of first guide walls 122, and second divided walls 128 of second guide walls 126 may be disposed in a mutually offset manner from one another by a predetermined distance along the vertical direction (the directions of arrows B1, B2).

By configuring the guide members 120 in this manner, when the second seal members 56*a*, 56*b* of the evaporator 16 are inserted between the first guide walls 122 and the second guide walls 126, the second seal members 56*a*, 56*b* are guided while in contact alternately with the first divided walls 124 and the second divided walls 128. Therefore, compared to the case of being guided while remaining in contact simultaneously with the first divided walls 124 and the second divided walls 128, sliding resistance at the time of insertion of the evaporator 16 can be further reduced, and the operation to assemble the evaporator 16 can be performed more easily and smoothly.

Stated otherwise, the second seal members 56*a*, 56*b* do not come into contact simultaneously with respect to both of the first and second guide walls 122, 126, and are guided while in contact alternately with respect to either one of the first and second guide walls 122, 126.

The vehicular air conditioner according to the present invention is not limited to the aforementioned embodiments, and it is a matter of course that various additional or modified structures may be adopted therein without deviating from the essential gist of the present invention.

The invention claimed is:

1. A vehicular air conditioner comprising an air conditioner casing, a passage provided in an interior of the air conditioner casing to flow air, and a heat exchanger disposed in facing relation to the passage in the interior of the air conditioner casing, wherein:
    the heat exchanger includes a pair of tanks disposed with an interval provided mutually therebetween, plural tubes disposed between the tanks and opposite ends of which are connected respectively to the tanks, and side plates provided on both ends of the tanks in a longitudinal direction of the tanks, and which are disposed substantially in parallel with the tubes;
    on the side plates, there are provided rail members extending in a longitudinal direction of the side plates, and projecting in directions away from the tubes with respect to the side plates;
    in the air conditioner casing, there are provided an insertion opening through which the heat exchanger is inserted, and a pair of guides extending toward an inner side in an insertion direction from the insertion opening, the pair of guides being configured to guide the heat exchanger along inner wall surfaces of the air conditioner casing by abutment against both rail members; and
    each guide of the pair of guides including a first guide wall and a second guide wall which have different lengths in the insertion direction, and ends of the first and second guide walls which are facing the insertion opening are offset from one another in the insertion direction.

2. The vehicular condition according to claim 1, wherein:
    the rail members are seal members configured prevent leakage of air through gaps between the heat exchanger and the air conditioner casing by abutment against the air conditioner casing; and
    the guides comprise sealing parts extending toward the inner side in the insertion direction from the insertion opening, and abutting against surfaces on the seal members that are substantially parallel with the side plates.

3. The vehicular air conditioner according to claim 1, wherein the pair of guides are formed by projecting the air conditioner casing outwardly in directions away from the heat exchanger.

4. The vehicular air conditioner according to claim 2, wherein the seal members provided on the side plates are formed integrally with seal members that are installed on the tanks.

5. The vehicular air conditioner according to claim 1, wherein the guides include inlet portions therein, which are formed to expand gradually toward a side of the insertion opening.

6. The vehicular air conditioner according to claim 2, wherein a width dimension of each of the seal members is smaller than a distance between the first and second guide walls of each of the pair of guides.

7. The vehicular air conditioner according to claim 1, further comprising a blower opening, wherein
    the insertion opening is positioned at an upper portion of the air conditioner casing, and the blower opening is aligned with the insertion opening, and
    the first and second guide walls of each of the pair of guides are aligned along a direction which is the same direction along which the blower opening and the insertion opening are aligned.

8. The vehicular air conditioner according to claim 1, further comprising a blower opening, wherein
    the insertion opening is positioned rearward of the blower opening in an air flow direction through the heat exchanger and at an upper portion of the air conditioner casing,
    the first and second guide walls of each of the pair of guides are aligned along the air flow direction with the first guide wall upstream of the second guide wall, and
    the first guide wall of each of the pair of guides is shorter in the insertion direction, than the second guide wall of each of the pair of guides.

9. The vehicular air conditioner according to claim 1, further comprising a cover member configured to cover the insertion opening after the heat exchanger has been inserted in the air conditioner casing, wherein
    the insertion opening is positioned at an upper front side portion of the air conditioner casing,
    the first and second guide walls of each of the pair of guides are aligned along an air flow direction through the heat exchanger, and
    the first guide wall of each of the pair of guides is positioned closer to the front side portion and is shorter in the insertion direction, than the second guide wall of the pair of guides.

* * * * *